April 8, 1969 R. E. HULL 3,437,837

ADJUSTABLE AMPLITUDE LIMITER CIRCUIT

Filed Nov. 19, 1965

WITNESSES:

Bernard R. Gieguer

James F. Young

INVENTOR
Robert E. Hull

BY A. Samuel Oddi
ATTORNEY

United States Patent Office 3,437,837
Patented Apr. 8, 1969

3,437,837

ADJUSTABLE AMPLITUDE LIMITER CIRCUIT

Robert E. Hull, Amherst, Buffalo, N.Y., assignor to Westinghouse Electric Corporation, Pittsburgh, Pa., a corporation of Pennsylvania Filed Nov. 19, 1965, Ser. No. 508,778
Int. Cl. H03k 5/08, 5/20
U.S. Cl. 307—237 7 Claims

ABSTRACT OF THE DISCLOSURE

A voltage limiter for operational amplifiers is disclosed wherein the positive and negative voltage limits of the operational amplitude may be set by a control voltage, with the amplitude of the control voltage establishing the limits independently of the polarity of the control voltage.

The present invention relates to limiter circuits, and it relates more particularly to adjustable limiter circuits for use with operational elements.

In many control system applications it is necessary to limit the voltage output of various operational elements, such as operational amplifier circuits, to within fixed excursion limits. It is essential that the output voltage of the operational element be limited in both the positive and negative excursion directions, and it is highly desirable if the excursion level at which the limiting operation takes effect can be made adjustable. The limiting operation as used in prior art control systems has usually been accomplished through the use of threshold devices which are responsive to a fixed output voltage level to set the limiting output level. A major disadvantage of using threshold devices is that the limiting level is fixed, and in order to adjust the limiting levels, it is necessary that the circuit be modified by replacing the threshold device or by other circuit modifications. It would, thus, be highly desirable if the limiter could be adjusted to various excursion levels electrically without the necessity of device replacement or circuit modifications.

It is, therefore, an object of the present invention to provide a new and improved adjustable limiter circuit.

It is a further object to provide a new and improved limiter circuit which is adjustable through the application of control signals thereto.

It is a still further object to provide a new and improved adjustable limiter circuit for controlling the output excursions of an operational element wherein the output levels are controlled electrically without the necessity of changing or modifying circuit elements to effect the adjustability.

Broadly, the present invention provides a limiter circuit for controlling the output level of an operational element in response to control signals; in which, a limiting output level of either polarity excursion of the operational element is established in response to a control signal, with the level being adjustable in response to the control signal independently of the polarity of the control signals.

These and other objects and advantages of the present invention will become apparent when considered in view of the following specification and drawing, in which.

Figure 1:
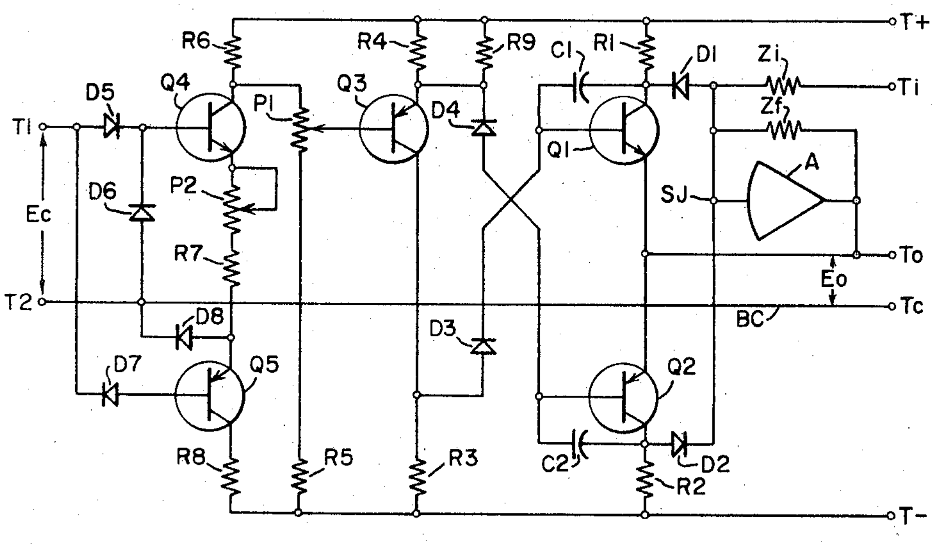
FIGURE 1 is a schematic diagram of the limiter circuit of the present invention.

Referring to FIG. 1, the limiter circuit of the present invention is shown being utilized to control the positive and negative output excursion voltage levels of an amplifier A, which may comprise, for example, a transistor operational amplifier whose structure and function are well known in the control arts. The output level of an operational amplifier may be controlled by establishing a very low impedance level relative to its input impedance between its input and output. Under these conditions the operational gain of the amplifier becomes very small, and thus increases in the amplitude of the input signal to the amplifier will cause only negligible output level increases. By then controlling the impedance between input and output of the amplifier to have very low value when the desired limiting levels of the amplifier are reached, limiting action may be accomplished.

Input signals are applied to the operational amplifier A from an input terminal T*i* through an input impedance Z*i*, which is connected to a summing junction SJ at the input of the amplifier A. The output of the amplifier A is taken from a terminal T*o*. A feedback impedance Z*f*, is connected between the summing junction SJ and the output terminal T*o*. The output voltage from the operational amplifier is established between the output terminal T*o* and a common terminal T*c*, which is connected to a common line BC that may, for example, be at ground potential. The output voltage between the terminals T*o* and T*c* is designated as E*o* on the figure. In order for the amplifier A to have its output limited to a set value independent of the input signals applied thereto it is necessary that the impedance between the summing junction SJ and the output terminal T*o* to be made very small. The gain G of the operational amplifier A may be defined as: $G=Zf/Zi$. Thus, by making Z*f* very small with respect to Z*i*, the gain G becomes very small, and limiting action is thereby achieved.

Figure 2:
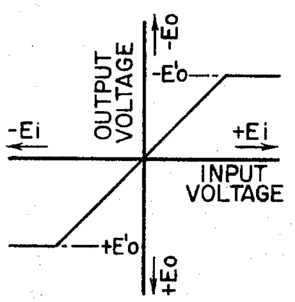
FIG. 2 is a plot of output voltage versus input voltage for an operational element as used herein.

FIG. 2 shows the operational characteristics of the operational amplifier A, wherein the output voltage E*o* is plotted as the function of the input voltage E*i*, which is applied to the terminal T*i* with respect to the common terminal T*c*. The slopes of this curve are defined by the gain ratio $Zf/Zi$. It can be seen that the output voltage E*o* is a linear function of the input voltage E*i* between the limits +E*o*′ and −E*o*′, at which levels the limiting effect takes place to hold the output voltage constant independently of an increasing positive or negative input voltage E*i*. In the circuit of FIG. 1 the excursion limits of the output voltage E*o* may be adjusted to various values as will now be explained.

Referring back to FIG. 1, a pair of feedback circuits are utilized, and each include; respectively, a transistor Q1 and a diode D1 and a transistor Q2 and a diode D2. The function of the feedback circuits is to provide a low impedance path from input to output of the operational amplifier A whenever the excursion limits of the output of the amplifier A are reached. As can be seen from the figure, the emitter electrodes of the transistors Q1 and Q2 are commonly connected to the output terminal T*o* of the amplifier A. The transistor Q1 is selected to be an NPN type, and the transistor Q2 is selected to be a PNP type. The collector electrode of the transistor Q1 is connected to the cathode of the diode D1 which has its anode connected to the summing junction SJ. The collector of the transistor Q2 is connected to the anode of the diode D2 which has its cathode connected to the summing junction SJ.

The transistor Q1 has its collector connected through a bias resistor R1 to a terminal T+ to which a source of positive polarity direct voltage, not shown, is connected. The collector of the transistor Q2 is connected through a bias resistor R2 to a terminal T− to which a source of negative direct potential, not shown, is connected. The base electrode of the transistor Q1 is connected to the cathode of a diode D3. The anode of the diode D3 is connected to the collector of a transistor Q3 which is of the PNP type. The base of the transistor Q2 is connected to a diode D4 at its anode electrode, the cathode of the diode D4 being connected to the emitter of the transistor Q3.

The resistance values of the resistors R1 and R2 are substantially the same and the magnitude of the positive and negative direct voltage sources applied to the terminals T+ and T—, respectively, are selected to have substantially the same magnitudes of positive and negative voltage outputs. A bias resistor R3 is connected between the collector of the transistor Q3 and the negative source terminal T—, while a bias resistor R4 is connected between the emitter of the transistor Q3 and the positive terminal T+. The resistive values of the resistors R3 and R4 are selected to be substantially the same. The voltages established at the collector and emitter of the transistor Q3 are thus substantially equal with respect to the common line BC, but of an opposite polarity with the resistance of resistors R3 and R4 being equal and presuming the current gain of the transistor Q3 to be infinite. Since the gain of the transistor Q3 is not infinite, a resistor R9 is connected across the resistor R9 in the emitter current of the transistor Q3 to compensate for the slightly higher current in the emitter of Q3 and thereby establishing substantially equal voltages at the emitter and collector relations of the transistor Q3 of opposite polarities. These voltages are coupled through the diodes D3 and D4, respectively, to act as reference voltages for the transistors Q1 and Q2. The magnitude of the voltages appearing at the collector and emitter of the transistor Q3 is controlled through the base of the transistor Q3.

To control the voltage applied to the base of the transistor Q3, a potentiometer P1 is provided which has a tap thereof connected to the base of the transistor Q3. One end of the potentiometer P1 is connected to the collector of a transistor Q4, and the other end of the potentiometer P1 is connected through a resistor R5 to the negative terminal T—. If the transistor Q4 is nonconductive, the voltage at the base of the transistor Q3 will be determined by the voltage divider circuit formed by a resistor R6, which is connected between one end of the potentiometr P1 and the positive terminal T+, the potentiometer P1 and the resistor R5. By the adjustment of the tap setting of the potentiometer P1, the voltage applied to the base of the transistor Q3 may then be adjusted. The resistor R6 is also connected to the collector of the transistor Q4.

Connected to the emitter of the transistor Q4 is a potentiometer P2. The other end of the potentiometer P2. is connected through a resistor R7 to the emitter of a PNP type transistor Q5, the transistor Q4 being of the NPN type. Between a control input terminal T1 and the base of the transistor Q4 is a diode D5 with its cathode toward the base of the transistor Q4. A control voltage E*c* is applied between the input terminal T1 and a terminal T2 which is connected to the common line BC. The control voltage E*c* is a direct voltage which may either have a positive or a negative polarity as will be discussed further below. A diode D6 is connected between the base of the transistor Q4 and the terminal T2, the cathode of the D6 being poled toward the base of the transistor Q4. The transistor Q5 has its base connected to the anode of a diode D7, with the cathode of the diode D7 being connected to the input terminal T1. A bias resistor R8 is connected between the collector of the transistor Q5 and the negative terminal T—. A diode D8 is connected between the emitter of the transistor Q5 and the common terminal T2 with the anode of the diode D7 being connected to the emitter of the transistor Q5.

Figure 3:
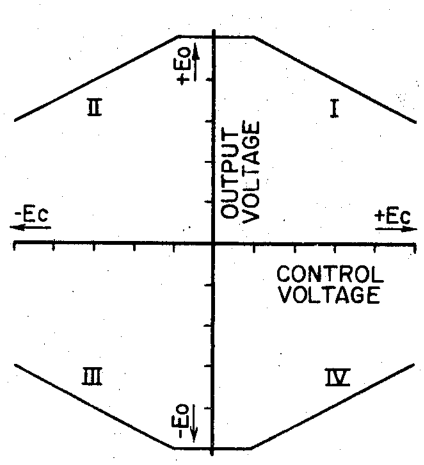
FIG. 3 is a plot of output voltage versus control voltage as provided in the circuit of FIG. 1.

Assume that the control voltage E*c* applied across the terminals T1 and T2 is at a value of zero volts. This will establish the maximum votlage excursion limits for the output of the amplifier A. As shown in FIG. 3, which is a plot of E*o* versus E*c*, the maximum voltage occurs about a zero volt between plus or minus level for E*c*. With zero volt being applied to the base of the transistor Q4 this transistor will be non-conductive; therefore, the bias potential applied to the base of the transistor Q3 will be established by the setting on the potentiometer P1 within the voltage divider including the resistor R6, the potentiometer P1 and the resistor R5. Under these conditions equal voltages will be established at the collector and emitter of the transistor Q3 which will be of opposite polarities. These voltages will then establish reference voltages for the bases of the transistors Q1 and Q2. As long as the output of the amplifier A remain within the limit level established, the limiter circuit will be isolated from the input of the amplifier A by the diodes D1 and D2 being reversed biased. This can be seen on FIGURE 1 wherein the diode D1 is reverse biased from the positive potential at the terminal T+ through the resistor R1 to the cathode thereof, and, similarly, the diode D2 is reverse biased from the negative terminal T— through the resistor R2 to the anode thereof. As long as the output of the amplifier A remains within the established limits both the transistors Q1 and Q2 will remain nonconductive.

Now, however, assume that the output E*o* of the amplifier A exceeds the limiting value established by a sufficient voltage to overcome the base-emitter junction drop of the transistor Q1 and the forward anode-cathode drop of the diode D3. Under these conditions the emitter of the transistor Q1 will be negative with respect to its base; therefore, transistor Q1 and the diode D3 becomes conductive. This causes current to flow from the input terminal T*i*, away from the summing junction SJ, and through the diode D1 and the collector-emitter circuit of the transistor Q1. This prevents further increase in the output potential E*o* of the operational amplifier A as a low impedance path is established through the diode D1 and the transistor Q1 from the input to the output of the operational amplifier A.

The magnitude of the voltages established at the collector and emitter of the transistor Q3 for a given output limiting value would be established by setting the potentiometer P1 so that the given output voltage would be just enough to exceed the forward drops of the base-emitter diodes and the transistors Q1 and Q2 and the diodes D3 and D4. For example, if the output of the operational amplifier A should exceed in a positive direction the value established at the emitter of the transisor Q3 by a sufficient value to overcome the forward drops of the emitter-base diode of the transistor Q2 and the forward drop of the diode D4, the output voltage which is connected to the emitter of the transistor Q2 would establish the emitter positive with respect to the base of the PNP transistor Q2 to render it conductive. Thus, the currnt flow in the emitter-collector circuit of the transistor Q2 and through the anode to cathode circuit of the diode D2 provides a low impedance path across the summing junction SJ to output of the operational amplifier A and, therefore, limits the output thereof to the established limit value. If the output voltage E*o* should exceed its negative limit by a value sufficient to overcome the forward drops of the base-emitter drop of the transistor Q1 and the diode D3, the transistor Q1 is rendered conductive by the negative voltage fed back to its emitter. Therefore, a low impedance path is provided through the transistor Q1 and the diode D1 across the amplifier A.

It should be noted that during non-limit operation that the diodes D3 and D4 are reversed biased to avoid excessive reverse voltages being applied across the base-emitter junctions of the transistors Q1 and Q2. A capacitor C1 is connected between the collector and base of the transistor Q1, and a capacitor C2 is connected between the collector and base of the transistor Q2. The purpose of the capacitors C1 and C2 is to attenuate the gain of the limiter circuit with frequency so as to avoid stability problems that might be introduced into the operational amplifier from using an active feedback element, the transistor Q1 or Q2, which causes high loop gains. As previously mentioned the resistor R9 is connected across the resistor R4 in the emitter circuit of the transistor Q3 to act as compensation for the nominal current gain of the transistor Q3.

The output limits of the voltage E*o* are maximum when the control voltage E*c* is at a zero value. By increasing the control voltage E*c* in the positive direction, the transistor Q4 is rendered conductive which makes the collector thereof less positive and, in turn, lowers the voltage applied from the tap on the potentiometer P1 to the base of the transistor Q3. The limit reference voltages established at the collector and emitter of the transistor Q3 are thereby lowered. Thus, the output limits of the amplifier A are reduced as the control voltage is increased in the positive direction as shown in quadrants I and IV of FIG. 3. The output limit, in other words, varies inversely with the positive magnitude of the control voltage. The gain of the limiter circuit is controlled by the potentiometer P2 connected in the emitter circuit of the transistor Q4. In the operation of the circuit the potentiometer P1 is adjusted first to establish the maximum limit output voltage; then the potentiometer P2 is adjusted to set the gain of the limiter circuit for effective operation.

When the control voltage E*c* is zero or less positive than the sum of the forward drops of the diode D5, the base-emitter diode of the transistor Q4 and the forward drop of the diode D8, the transistor Q4 is nonconductive, but it becomes conductive when the control voltage is made sufficiently positive as explained above. The limiter circuit as shown at FIG. 3 also operates on negative control voltages which is made possible through the use of the circuit including the transistor Q5. Whenever the control voltage is zero, positive or less negative than the sum of the four voltage drops of the diode D7, the base-emitter junction of the transistor Q5, the diode D6 and the base-emitter junction of the transistor Q4, the transistor Q5 is nonconductive. However, when the control voltage E*c* becomes sufficiently negative to overcome the forward drops of these last-mentioned junctions, the transistor Q5 will become conductive. At this time the base of the transistor Q4 is isolated from the input terminal T1 due to the diode D5 being reversed biased. The diode D6, however, is forward biased by the negative voltage E*c* which effectively clamps the base of the transistor Q4 to the common line B*c*. The diode D8 is reverse biased at this time being connected to the terminal T2 through its cathode electrode. Under these conditions the transistor Q4 may be controlled through its emitter electrode and operates in a common-base configuration. Thus, as the control voltage E*c* becomes increasingly negative, the transistor Q5 becomes more conductive which drives its emitter electrode in the negative direction. The emitters of the transistors Q5 and Q4 are coupled through the resistor R7 and the potentiometer P2. Therefore, as the transistor Q5 becomes more conductive, the transistor Q4 now operative in a common-base mode also becomes more conductive. The collector of the transistor Q4 thus becomes less positive to lower the value of positive potential appearing at the tap of the potentiometer P1, which, in turn, lowers the bias applied to the base of transistor Q5. The reference voltages drop as both the collector and emitter of the transistor Q5 are lowered to reduce the output limit level of the amplifier A as previously discussed. This is shown in the quadrants II and III of FIG. 3, with the output limit E*o* decreasing with negative increasing control voltage E*c*.

The limiting circuit is, therefore, responsive to the absolute value of the control voltage E*c* and will thus supply the same limit output level E*o* for the same positive or negative values of control voltage (±E*c*). This symmetry of operation may be seen by considering that a unit positive change in the control voltage E*c* will cause a unit positive change in the voltage seen at the emitter of the transistor Q4, with the emitter of the transistor Q5 being clamped to the common line BC through the diode D8 for the positive voltage. On the other hand, a unit negative change in the control voltage E*c* will cause a unit negative change in the voltage appearing at the emitter of the transistor Q5, with the emitter of the transistor Q4 being effectively clamped to the common line BC through the diode D6 and the base-emitter junction of the transistor Q4. The voltage change across the potentiometer P2 and the resistor R7 connecting the emitters of the transistors Q4 and Q5 is thus the same for either the direction, positive or negative, of voltage change. The voltage change being the same, the current passing through the resistor R6 will also be the same for either polarity. Therefore, the voltage appearing at the collector of the transistor Q4 will have the same change for either polarity of control voltage E*c* which will be applied to the potentiometer P1 that is connected to the collector of the transistor Q4.

One circuit consideration must be taken into account in order to derive substantially perfect symmetry. That is, since positive values of control voltage E*c* cause current to pass through three forward biased junctions, namely, diode D5, the base-emitter junction of the transistor Q4 and the diode D8; while negative values of the control voltage E*c* cause current to flow through four forward biased junctions, namely, the base-emitter of the transistor Q4, the base-emitter of the transistor Q5, the diode D7 and the diode D6. It can be seen, due to the symmetry of the circuit, that the forward drop of the diode D5 is substantially equal to the drop of the diode D7, and the base-emitter drops of the transistors Q4 and Q5 are substantially equal. This will then require the forward drop of the diode D8 to compensate for the forward drop of the diode D6 plus the base-emitter drop of the transistor Q4. A convenient method of equalizing the voltage drops is to select the diode D6 to be a germanium diode, while all the other diodes and transistors are silicon ones. If a germanium diode is used for the diode D6, it will have a lower drop than will a silicon diode, which when added to that of the base-emitter drop of the transistor Q4 will approximately equal the drop across the diode D8. Since the diode D8 carries more current than the base-emitter junction of the transistor Q4, the diode D8 will have a greater voltage drop than the base-emitter of the transistor Q4; so substantial symmetry of operation will be accomplished.

It can thus be seen that the limiter circuit as shown in FIG. 1 provides adjustable limit levels of the output of the operational element A by selecting the value of the control potential E*c*. The limiter circuit, moreover, provides symmetrical limit outputs according to the absolute value of the control potential E*c*. When, however, the operational element A is operating within the established limit output levels, the limiter circuit is isolated from the input of the operational element.

Although the present invention has been described with a certain degree of particularity, it should be understood that the present disclosure has been made only by way of example and that numerous changes in the details of the circuitry and the combination and arrangement of parts and elements can be resorted to without departing from the spirit and scope of the present invention.

I claim as my invention:

1. A limiting circuit for controlling the output limits of an operational element in response to control signals comprising: feedback circuit means connected between the input and output of the operational element and including a pair of feedback circuits each including active element means having applied thereto reference signals for establishing thereby the positive and negative output limits for the operational element, the operative condition of each of said active element means being responsive respectively to the positive and negative output limits of said operational element to prohibit the operational element from exceeding its positive and negative output limits, and means to isolate said limiting circuit from the operational element and operating within the input limits thereof; and reference signal means for developing said reference signals in response to said control signals and applying said reference signals to said active element means.

2. The circuit of claim 1 wherein: said active element means in each of said pair of feedback circuits comprises a transistor having said reference signals applied to respective electrodes thereof and the output of said operational element being commonly applied to another electrode of said transistors for controlling the conductivity thereof.

3. The circuit of claim 2 wherein: said reference signal means including a reference transistor having substantially equal voltage developed at separate electrodes thereof in response to said control signals, said substantially equal voltages acting as said reference signals to be applied to said active elements of said pair of feedback circuits.

4. The circuit of claim 3 also including: unidirectional means for coupling the substantially equal voltages to said transistors of said pair of feedback circuits when the output of the operational element exceeds the established output limits and to protect these transistors from excessive reverse voltages when the operational element is operative within the established output limits.

5. The circuit of claim 3 wherein: said reference signal means further include an input circuit for receiving said control signals and comprising, a pair of input transistors, one of said pair of transistors being responsive to provide an output to said reference transistor to establish the magnitude of said substantially equal voltages independently of the polarity of said control signal.

6. The circuit of claim 5 also including: a voltage divider circuit operatively connected to the one of said transistors of said input circuit for setting the output of that transistor and applying this output to an electrode of said reference transistor.

7. The circuit of claim 5 also including: a variable impedance element operatively connected between a pair of electrodes of said pair of transistors of said input circuit and being adjustable to control the gain of said limiter circuit.

References Cited

UNITED STATES PATENTS

| | | | |
|---|---|---|---|
| 3,121,200 | 2/1964 | Samson | 328—143 |
| 3,209,266 | 9/1965 | White | 307—237 |

ARTHUR GAUSS, *Primary Examiner.*

J. D. FREW, *Assistant Examiner.*

U.S. Cl. X.R.

307—229, 235; 328—168, 169